United States Patent [19]
Schmed

[11] Patent Number: 5,842,407
[45] Date of Patent: Dec. 1, 1998

[54] APPARATUS FOR PREPARING FILTER COFFEE

[76] Inventor: Arthur Schmed, Langrütistr. 87, CH-8635 Oberdürnten, Switzerland

[21] Appl. No.: 820,152

[22] Filed: Mar. 19, 1997

[30] Foreign Application Priority Data

Mar. 25, 1996 [CH] Switzerland .................. 1996 0767/96

[51] Int. Cl.$^6$ ...................................................... A47J 31/30
[52] U.S. Cl. .................................. 99/290; 99/293; 99/304
[58] Field of Search .............................. 99/290, 293, 294, 99/304, 307; 426/433

[56] References Cited

U.S. PATENT DOCUMENTS 5,154,110  10/1992  Chang ..................................... 99/293 X
5,357,848  10/1994  Eugster et al. ......................... 99/293 X Primary Examiner—Reginald L. Alexander
Attorney, Agent, or Firm—Tarolli, Sundheim, Covell, Tummino & Szabo

[57] ABSTRACT

In order to generate steam in an apparatus for preparing filter coffee, a design is proposed which comprises a water storage container and a device for separating water and steam. A heating element is provided for heating water and for generating steam. The separating device comprises an inlet connected to the outlet of the heating element and an outlet connected to a steam nozzle. The water storage container comprises an inlet connected to a fresh water tank and an outlet connected to the inlet of the heating element. Moreover, a throttle member is provided close to the outlet of the water storage container; the throttle member restricts, during the generation of steam, the amount of water fed to the heating element per unit of time. By such a design, dry steam, particularly suitable to prepare a cappuccino beverage, can be generated in a simple manner.

19 Claims, 3 Drawing Sheets

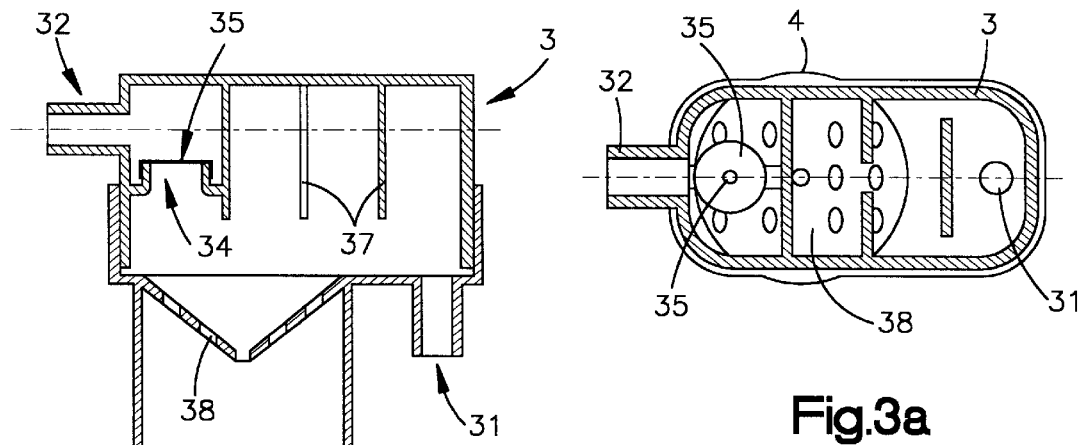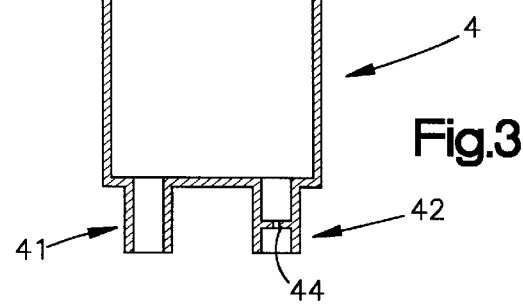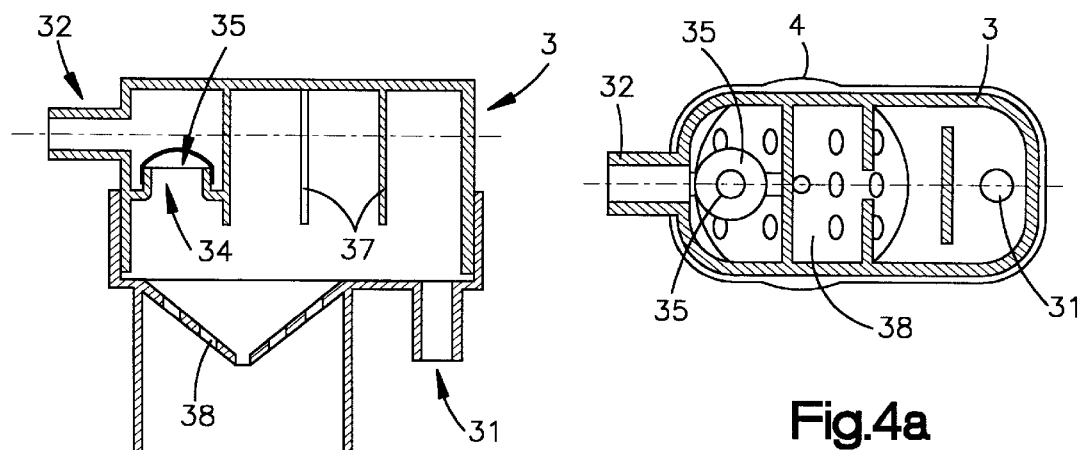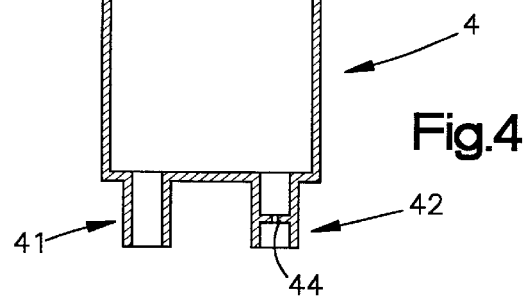

APPARATUS FOR PREPARING FILTER COFFEE

FIELD OF THE INVENTION

The present invention generally refers to an apparatus for preparing filter coffee and, more particularly, to an apparatus suitable for preparing either a normal filter coffee beverage or a so-called cappuccino coffee beverage.

PRIOR ART

Basically, two generic concepts of coffee machines can be distinguished. According to a first generic concept, the coffee machine comprises a pump adapted to pressurize the heated brewing water and to feed it through the coffee powder received in a brewing chamber. According to a second generic concept, the heated brewing water flows under the influence of gravity, without being pressurized, through the coffee powder received in a filter hopper. A coffee machine according to the second generic concept usually comprises just a heating element both for heating the water and feeding it to the filter hopper. A pump is not required, because the water expands during heating according to thermodynamic laws and flows through a rising pipe to an outlet, from where it can flow through the coffee powder under the influence of gravity. An apparatus according to this second generic concept is known as filter coffee machine. It is understood that that the present invention refers to an improvement of an apparatus according to the second generic concept, i.e. of a filter coffee machine.

The reason, why such filter coffee machines, additionally comprising a steam outlet, have not been present in the market up to now may be seen in the fact that such a machine would be quite expensive. The provision of an additional device for the generation of steam calls for additional considerable expenditures; the result would be that the low priced filter coffee machines would become too expensive.

A further problem in connection with the generation of steam is that the user requires a fairly dry steam for preparing a cappuccino beverage; the provision of a mixture of boiling water and steam would be not suitable for this purpose.

OBJECT OF THE INVENTION

Thus, it is an object of the invention to provide an apparatus for preparing filter coffee by means of which dry steam can be generated, whereby the apparatus shall remain simple in design and inexpensive to manufacture.

SUMMARY OF THE INVENTION

In order to meet this and other objects, the invention provides, according to a first aspect, an apparatus for preparing filter coffee, comprising a fresh water tank and at least one heating element for heating water, having a water inlet and a water outlet.

The water inlet communicates with a source of water and the water outlet communicates with a coffee brewing filter receiving assembly. The apparatus further comprises a steam generator adapted to generate a steam-water mixture, whereby the steam generator incorporates a device for separating steam and water.

In such an apparatus, a steam-water mixture heated by the heating element can be split into dry steam and hot water.

According to a second aspect, the invention provides an apparatus for preparing filter coffee, comprising a fresh water tank, and at least one heating element for heating water, having a water inlet and a water outlet.

The water inlet communicates with a source of water and the water outlet communicates with a coffee brewing filter receiving assembly. The apparatus further comprises a steam generator adapted to generate a steam-water mixture, whereby the steam generator incorporates a device for restricting the amount of water fed to the inlet of the heating element per unit of time.

Thus, according to this second aspect, a mode of operation can be realized in which only such an amount of water is fed to the heating element which can be evaporated at once and continuously, respectively.

According to a third aspect of the invention, both measures can be combined. In other words, the invention also provides an apparatus for preparing filter coffee, comprising a fresh water tank and at least one heating element for heating water, having a water inlet and a water outlet.

The water inlet communicates with a source of water and the water outlet communicates with a coffee brewing filter receiving assembly. The apparatus further comprises a steam generator adapted to generate a steam-water mixture and incorporating a device for separating steam and water, as well as a device for restricting the amount of water fed to the inlet of the heating element per unit of time.

According to a preferred embodiment of the invention, the apparatus comprises a steam generator including a water storage container disposed within the pressurized water and water-steam circuit, respectively, whereby the water storage container comprises a first outlet communicating with the inlet of the heating element. The device for restricting the amount of water fed to the heating element is thereby located in or close to the outlet of the water storage container. Thus, it can be reached that the steam is continuously generated and does not escape from the steam outlet in bursts.

According to a further embodiment of the invention, the steam generator comprises a water storage container disposed within the pressurized water and water-steam circuit, respectively, whereby the water storage container and the device for separating steam and water are united in a common constructive unit. The water storage container is connected to the device for separating steam and water to receive the water stripped in the device for separating steam and water. In this way, the water consumption is substantially decreased during the generation of steam.

BRIEF DESCRIPTION OF THE DRAWINGS

In the following, an embodiment of the apparatus according to the present invention will be further described, with reference to the accompanying drawings, in which:

FIG. 3 shows a longitudinal sectional view of a device for separating water and steam;

FIG. 3a shows a cross sectional view of the device according to FIG. 3;

FIG. 4 shows a cross sectional view of the device according to FIG. 3, with deflected diaphragm; and FIG. 4a shows a cross sectional view of the device according to FIG. 4.

DETAILED DESCRIPTION OF A PREFERRED EMBODIMENT

Figure 1:
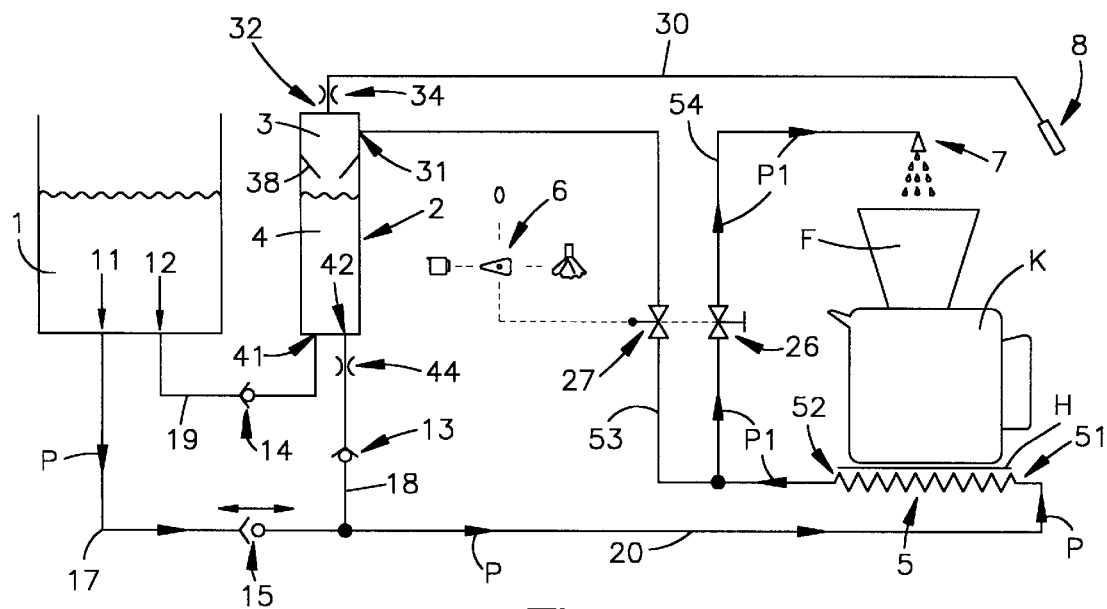
FIG. 1 shows a schematic sketch of the general layout of an apparatus for preparing filter coffee incorporating a steam generator assembly, in a first phase of operation.

In the following, with the help of FIG. 1, the general layout of an apparatus for preparing filter coffee incorporating a steam generator assembly shall be further explained, in fact in a first phase of operation, i.e. during the creation of brewing water and brewing of the coffee powder. The apparatus for preparing filter coffee essentially comprises a tank 1 for fresh water, a heating element 5, preferably designed as a constant flow water heater, a selector switch 6, an outlet 7 for hot water as well as a steam nozzle 8. Moreover, there is provided a filter hopper F adapted to receive the coffee powder to be brewed, while the finished coffee beverage flows into a coffee pot designated by reference sign K. Above the heating element 5, there is provided a heater plate H. The steam generator assembly essentially comprises a unit 2 including a separator member 3 as well as a water storage container 4, several conduits 18, 19, 20, 30, 53, valve members 13, 14 as well as throttle members 34, 44; it is understood that the heating element 5 is to be considered also as part of the steam generator assembly during the operation of creating steam.

The fresh water tank 1 is connected to the heating element 5 by means of a fresh water conduit 17 and a subsequent conduit 20. Inserted into the fresh water conduit 17 is a non-return valve 15. A hot water conduit 54 leads from an outlet 52 of the heating element 5 to the hot water outlet 7, and a further conduit 53 leads from the outlet 52 of the heating element 5 to a first inlet of the separator member 3. An outlet 32 of the separator member 3 opens into a steam nozzle via a steam conduit 30. The lower portion of the unit 2 comprises a water storage container 4 which is connected to the fresh water tank 1 via a conduit 19. An outlet 42 of the water storage container 4 is connected to an inlet 51 of the heating element 5 by means of conduits 18 and 20. It should be noted that in each case a non-return valve 14 and 13, respectively, is provided both before the inlet 41 and after the outlet 42 of the water storage container. The first non-return valve 14 prevents water from flowing from the water storage container 4 back to the fresh water tank 1, while the second non-return valve 13 prevents water from flowing from the heating element 5 to the water storage container 4.

In the region of the outlet 32 of the separator member 3, a first throttle member 34 is provided, and in the region of the outlet 42 of the water storage container 4, a second throttle member 44 is provided; the function of these throttle members 34, 44 will be explained in more detail herein after. Moreover, in the hot water conduit 54, there is inserted a gate valve member 26, and in the conduit 53 leading to the inlet 32 of the separator member 3, there is inserted a gate valve member 27. Both gate valve members 26, 27 can be alternately operated by means of the selector switch 6.

The heating element 5 is automatically operated under the influence of the selector switch 6, as is well known in the art, as soon as the selector switch 6 is rotated from its vertical 0-Position into one of its horizontal operating positions. It is understood that the heating element 5 is not active as long as the selector switch 6 is in its vertical 0-position.

In the phase of operation shown in FIG. 1, fresh water flows, as indicated by the arrows P in FIG. 1, from the fresh water tank 1 to the heating element 5 where it is heated. The heated water flows, as indicated by the arrows P1 in FIG. 1, through the hot water conduit 54 and the opened gate valve member 26 to the hot water outlet 7, from where it gets into the filter hopper F. The hot water in the filter hopper F brews the coffee powder contained in the filter hopper F and finally flows, now in the form of a coffee beverage, into the coffee pot K. A feed pump for feeding the hot water is not required in such an apparatus for preparing coffee, because the water expands when heated, according to well known thermodynamic laws, and flows in bursts, i.e. with the valve 15 alternately open and closed, through the hot water conduit 54 to the outlet 7. Therefrom, obeying the gravity, the hot water can penetrate the coffee powder contained in the filter hopper F in a pressure-less state. The mode of operation of such apparatuses for preparing filter coffee being well known in the art removes the need for further detailed explanations.

Since the gate valve member 27 provided in the conduit 53 leading from the outlet of the heating element 5 to the separator member 3 is closed during the creation of brewing water, the separator member 3 is not active during the creation of hot water, as explained above.

Figure 2:
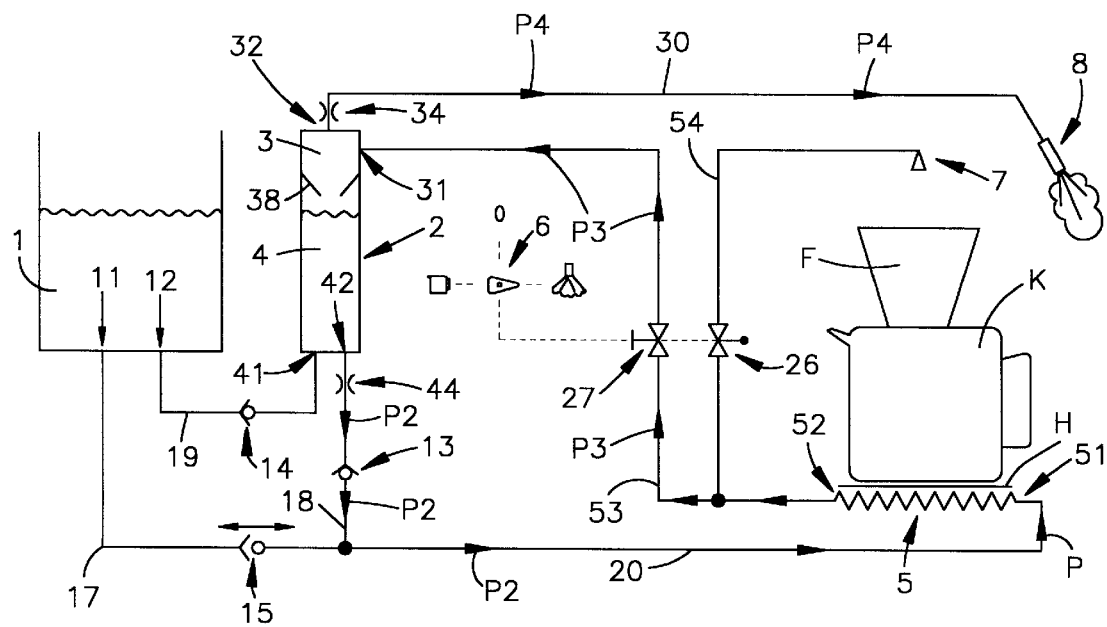
FIG. 2 shows the apparatus according to FIG. 1, in a second phase of operation.

FIG. 2 shows the apparatus according to FIG. 1 in a second phase of operation in which steam is generated. For this purpose, the selector switch 6 is rotated from its left horizontal position into its right horizontal position. Thus, the gate valve member 26 located in the brewing water conduit 54 is closed and the other gate valve member 27 is opened. The water and water-steam mixture, respectively, heated in the heating element 5 flows via the conduit 53 into the separator member 3 where the steam is separated from the water. The steam separated in the separator member 3 is conducted to the steam nozzle 8 through the outlet 32 and the steam conduit 30. Simultaneously, the water separated from the steam in the separator member 3 drops, obeying the laws of gravity, downwards through a sieve member 38 into the water storage container 4.

By means of the throttle members 34, 44 provided at the two outlets 32, 42 of the unit 2, an overpressure is maintained in the unit 2 during the generation of steam. Under the influence of this overpressure, the non-return valve member 14 provided in the conduit 19 remains closed, while the non-return valve member 15 provided in the fresh water conduit 17 remains closed as well under the influence of the general system pressure. However, the non-return valve member 13 located behind the outlet 42 of the water storage container 4 is open.

Water is continuously fed to the heating element 5 via the outlet 42 of the water storage tank 4, whereby the throttle member 44 provided at the exit of this outlet 44 restricts the water supply in such a manner that only a well defined amount of water per unit of time can flow to the heating element 5. The amount of water flowing to the heating element 5 per unit of time is adjusted such that essentially the entire water fed to the heating element 5 is immediately evaporated therein.

The throttle member 34 located in the region of the outlet 32 of the separator member 3 is constituted preferably by a flexible diaphragm provided with an aperture. Such a diaphragm can be deflected and curved, respectively, under the influence of an overpressure present in the interior of the separator member 3. As soon as the diaphragm is deflected, its aperture is automatically increased in size. By the provision of this diaphragm, there is established a simple regulation circuit which is responsible for maintaining a predetermined overpressure in the separator member 3. Moreover, the diaphragm can serve as a safety device which is destroyed as soon as a predetermined pressure limit is exceeded. In this way, it is ensured that there is no risk of a dangerous overpressure being built up in the interior of the separator element 3, even if the aperture in the diaphragm is plugged, e.g. by furring.

In such a design, in which the water storage container 4 is located within the pressurized water and water-steam circuit, respectively, the goal is reached that water is continuously fed to the heating element 5, with the result that also the steam is generated continuously and not in bursts.

As soon as the conduit 53 has been closed again under the influence of the gate valve member 27, the overpressure in the unit 2 is reduced and the unit 2 is filled up with fresh water from the fresh water tank 1 via the conduit 19, according to the well known principle of the communicating vessels.

Figure 2A:
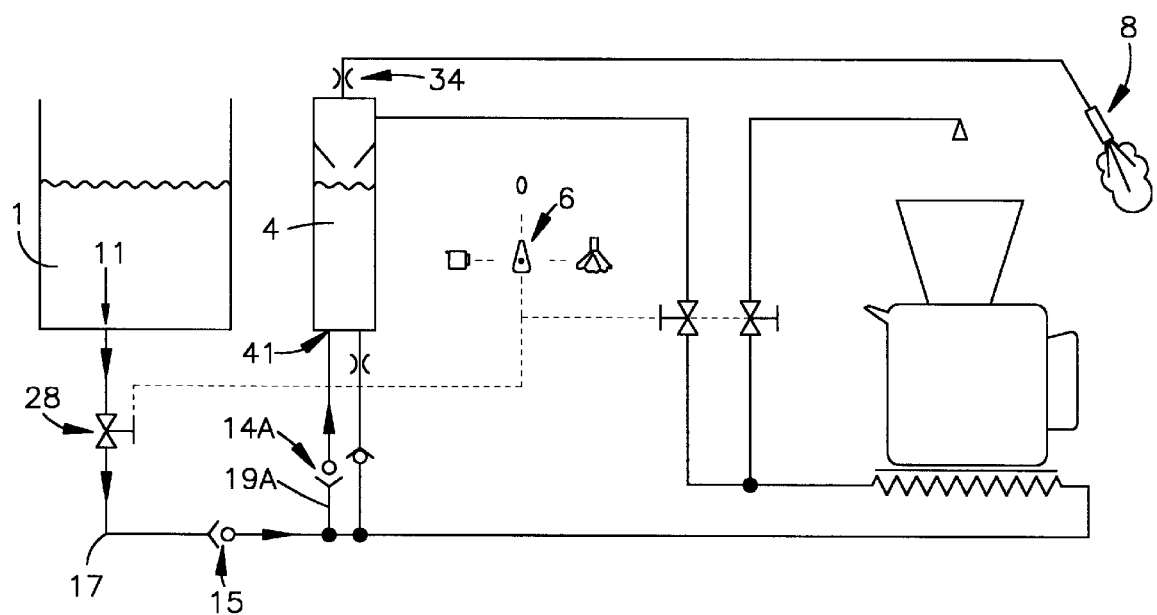
FIG. 2a shows a modified embodiment of the apparatus shown in FIG. 2.

FIG. 2a shows a modified embodiment of the apparatus for preparing filter coffee shown in FIG. 2. In this embodiment, the water storage container 4 is indirectly connected to the fresh water tank 1 by means of a conduit 19a. Again, a gate valve member 14a is inserted into the conduit 19a. Moreover, a further gate valve member 28 is provided in the fresh water conduit 17 which is operated by the selector switch 6. In the phase of operation shown in FIG. 2a, the water storage container 4 is filled with fresh water from the fresh water tank 1 after steam having been produced. In contrary to the embodiment discussed herein before, the fresh water conduit 17 is closed by means of the gate valve member 28 during the creation of steam.

FIG. 3 shows a longitudinal sectional view of a device for separating water and steam, i.e. the unit 2, and FIG. 3a shows a cross sectional view of the unit 2 according to FIG. 3. The unit 2 comprises an oval upper portion 3 which is constituted as a separator member, and a hollow cylindrical base portion 4 serving as a water storage container. Behind the inlet 31 of the separator member 3, several baffle members 37 are provided which are adapted to separate the steam from the water-steam mixture heated by the heating element 5. The base portion 4 is provided with a hopper-shaped sieve member designated by reference numeral 38. In front of the outlet 32 of the separator member 3, the afore mentioned diaphragm 34 is located which is provided with an aperture 35. The throttle member 44 located at the outlet 42 of the water storage container 4 is designed in the shape of a perforated disk.

FIG. 4 shows a cross sectional view of the unit 2 according to FIG. 3, with deflected diaphragm 34, and FIG. 4a shows a cross sectional view of the unit 2 according to FIG. 4. These figures clearly show that the size of the central aperture 35 in the diaphragm 34 is increased as soon as the diaphragm 34 is deflected.

Thanks to the design of a filter coffee machine according to the invention, it is possible to create steam at any time and in a simple manner by means of the filter coffee machine itself, particularly without the need to provide a pump member or another power-driven dosage means. Such filter coffee machines are particularly suitable for preparing cappuccino beverages. For this purpose, a milk container (not shown in the drawings) can be provided from which foamed milk can be taken out by means of a steam conduit provided with an aperture and led through the milk container, with the help of the well known venturi effect.

Moreover, it should be noted that the intrinsic characteristics of a normal filter coffee brewing apparatus are fully maintained.

It should also be noted that the embodiments shown in the drawings and described herein before are by no means to be considered final. Particularly, it is possible within the scope of the present invention to provide two heating elements instead of a single one, if appropriate. Such a design would have the advantage that brewing water and steam could be created simultaneously in case of need.

It is also possible that the outlet of the water storage container is led into a separate container, with the result that the water to be heated is supplied from the fresh water tank also in the case of creating steam. In this case, the water storage container would not have to be provided with a fresh water inlet.

Finally, it could be imagined that the heating element is operated during the creation of steam with different power, preferably higher power, than during the preparation of hot brewing water. A further modification could be seen in the fact that the unit 2 is integrated in the fresh water container.

What is claimed is:

1. An apparatus for preparing filter coffee, comprising:

a fresh water tank;

a coffee brewing filter receiving means;

at least one heating means for heating fresh water from said fresh water tank, said at least one heating means having a water inlet fluidly connected to said fresh water tank and a water outlet fluidly connected to said coffee brewing filter receiving means; and steam generator means for generating a steam-water mixture, said steam generator means being fluidly connected with said fresh water tank and with said water outlet of said at least one heating means, said steam generator means including means for separating steam and water.

2. An apparatus for preparing a filter coffee, comprising:

a fresh water tank;

a coffee brewing filter receiving means;

at least one heating means for heating fresh water from said fresh water tank, said at least one heating means having a water inlet fluidly connected to said fresh water tank and a water outlet fluidly connected to said coffee brewing filter receiving means; and steam generator means for generating a steam-water mixture, said steam generator means being fluidly connected with said fresh water tank and with said water outlet of said at least one heating means, said steam generator means including means for restricting the amount of water fed to said water inlet of said at least one heating means per unit of time.

3. An apparatus for preparing filter coffee, comprising:

a fresh water tank;

a coffee brewing filter receiving means;

at least one heating means for heating fresh water from said fresh water tank, said at least one heating means having a water inlet fluidly connected to said fresh water tank and a water outlet fluidly connected with said coffee brewing filter receiving means;

a steam generator means for generating a steam-water mixture, said steam generator means being fluidly connected with said fresh water tank and with said water outlet of said at least one heating means, said steam generator means including means for separating steam and water; and means for restricting the amount of water fed to said water inlet of said at least one heating means per unit of time.

4. The apparatus according to claim 1 or claim 3, in which said means for separating steam and water comprises a separator member having a first inlet communicating with said water outlet of said at least one heating means and a first outlet communicating with a steam outlet nozzle provided in said steam generator means.

5. The apparatus according to claim 1, claim 2, or claim 3, in which said steam generator means comprises a water storage container means disposed within the pressurized water and water-steam circuit, respectively, said water storage container means comprising a first outlet communicating with said water inlet of said at least one heating means.

6. The apparatus according to claim 2 or claim 3, in which said steam generator means comprises a water storage container means disposed within the pressurized water and water-steam circuit, respectively, said water storage container means comprising an outlet communicating with said water inlet of said at least one heating means, said means for restricting the amount of water fed to said water inlet of said at least one heating means per unit of time being disposed in said first outlet of said water storage container means or immediately after said first outlet of said water storage container means.

7. The apparatus according to claim 5, further comprising a non-return valve located between said first outlet of said water storage container means and said water inlet of said at least one heating means and adapted to prevent water from flowing back from said at least one heating means to said water storage container means.

8. The apparatus according to claim 6, in which said means for restricting the amount of water fed to said water inlet of said at least one heating means per unit of time comprises a throttle member located in said outlet of said water storage container means or inserted into a conduit leading from said outlet of said water storage container means to said water inlet of said at least one heating means.

9. The apparatus according to claim 1 or claim 3, in which said steam generator means comprises a water storage container means disposed within the pressurized water and water-steam circuit, respectively, said water storage container means and said means for separating steam and water being united in a common constructive unit, whereby said water storage container means is connected to said means for separating steam and water to receive the water separated in said means for separating steam and water.

10. The apparatus according to claim 5, in which said water storage container means comprises a second outlet communicating with said fresh water tank and in which there is provided a non-return valve located between said second outlet of said water storage container means and said fresh water tank which prevents water from flowing back from said water storage container means to said fresh water tank.

11. The apparatus according to claim 1, claim 2, or claim 3, further comprising a conduit means connecting said fresh water tank to said water inlet of said at least one heating means and a non-return valve inserted into said conduit means, said non-return valve being adapted to prevent water from flowing back from said at least one heating means to said fresh water tank.

12. The apparatus according to claim 4, in which said separator member comprises a plurality of baffle means located behind said first inlet of said separator member and adapted to separate steam from the water-steam mixture generated by said at least one heating means.

13. The apparatus according to claim 4, further comprising a perforated diaphragm means which is located in the region of said first outlet of said separator member.

14. The apparatus according to claim 13, in which said perforated diaphragm means is flexible such that it can be deflected under the influence of an overpressure building up in the interior of said separator member, whereby the perforation in the diaphragm increases in size.

15. The apparatus according to claim 1, claim 2, or claim 3, further comprising a hot water outlet and a first conduit means connecting said water outlet of said at least one heating means to said hot water outlet.

16. The apparatus according to claim 15, in which said water outlet of said at least one heating means is connected to said first outlet of said separator member via a second conduit means, the apparatus further comprising a first gate valve means inserted into said first conduit means, a second gate valve means inserted into said second conduit means, and an operating means for alternately activating said first and second gate valve means for alternately closing said first and second conduit means, respectively.

17. The apparatus according to claim 16, in which said operating means is adapted to simultaneously activate said at least one heating means when said first and second gate valve means, respectively, is activated.

18. The apparatus according to claim 4, comprising a first and second heating means, the water outlet of said first heating means being connected to said separator member and the water outlet of said second heating means communicating with said coffee brewing filter receiving means.

19. The apparatus according to claim 11, further comprising a gate valve means inserted into said conduit means connecting said fresh water tank to said at least one heating means, said gate valve means being adapted to be closed during the generation of steam.

\* \* \* \* \*